United States Patent [19]
Reiber

[11] 3,941,462
[45] Mar. 2, 1976

[54] METHOD AND APPARATUS FOR TRANSFERRING WIDE-BAND SOUND SIGNALS

[75] Inventor: Hans Reiber, Stuttgart, Germany

[73] Assignee: International Standard Electric Corporation, New York, N.Y.

[22] Filed: Oct. 15, 1974

[21] Appl. No.: 514,861

[30] Foreign Application Priority Data
Oct. 17, 1973   Germany............................ 2352124

[52] U.S. Cl..................................... 352/12; 352/27
[51] Int. Cl.²......................................... G03B 31/00
[58] Field of Search .................... 352/12, 26, 27, 29

[56] References Cited
UNITED STATES PATENTS

| | | | |
|---|---|---|---|
| 3,774,999 | 11/1973 | Ivestor | 352/12 |
| 3,848,978 | 11/1974 | Wray | 352/12 X |
| 3,850,513 | 11/1974 | Wray | 352/29 X |

*Primary Examiner*—Monroe H. Hayes
*Attorney, Agent, or Firm*—John T. O'Halloran; Menotti J. Lombardi, Jr.; Peter Van Der Sluys

[57] ABSTRACT

The invention provides a system for developing sync pulses when PICOR is used on sound film systems. The sprocket holes in the feed track of the film are used in conjunction with a light source and a photocell to develop sync pulses which are required to synchronize a rotating electronic switch with periodic sequential information recorded on the sound track of the film.

15 Claims, 5 Drawing Figures

3,941,462

METHOD AND APPARATUS FOR TRANSFERRING WIDE-BAND SOUND SIGNALS

BACKGROUND OF THE INVENTION

In a PICOR system for transferring wide-band sound signals, a sound signal is divided into a lower and a higher frequency range and the partial signal of the lower frequency range is transferred directly and instead of the partial signal of the higher frequency range, the amplitude information of partial frequency ranges obtained by splitting up said higher frequency range by means of band-pass filters is transferred by periodic sequential modulation of a single subcarrier with the amplitude information.

At the reproducing end, said subcarrier is demodulated and the amplitude information is separated again by a time selection operating synchronously with the sequential modulation at the pick-up end. The amplitude information of the partial frequency ranges serves as a modulating signal for equivalent signals lying approximately in the center of the individual partial frequency ranges. The modulated equivalent sound signals of the partial frequency ranges of the higher frequency range are added to the directly transferred sound signal of the lower frequency range for reproduction of the total signal.

For such a system using sequential transfer of the amplitude information it has already been proposed to transfer the signal serving for synchronization together with the sound signal. In that case care must be taken that the sync signal is separated from the other signals so as to be capable of being unambiguously evaluated and, on the other hand, remains inaudible although its frequency lies in the audible range.

This manner of transfer is advantageous inasmuch as no special time or frequency channel is needed for the sync signal.

SUMMARY OF THE INVENTION

The present invention relates to a PICOR system applied to sound film wherein the signal of the partial lower frequency range is recorded on a sound track along with the periodic sequentially modulated subcarrier with the amplitude information.

It is the object of the invention to propose a simple manner of transferring the sync signal, taking into account the peculiarities of a sound film.

The invention is characterized in that a rotary switch located at the reproducing end and serving for time selection is synchronized by evaluating periodic information provided on the feed track of the sound film.

The advantage of the invention lies in the fact that use is made of an existing, spatial channel in the form of the feed track, which is separated from the picture portion and the sound track, and that the evaluation itself can be effected at low cost.

Further advantages and details of the invention will be apparent from the following description of the accompanying drawings.

DESCRIPTION OF THE PREFERRED EMBODIMENT

Figure 1:
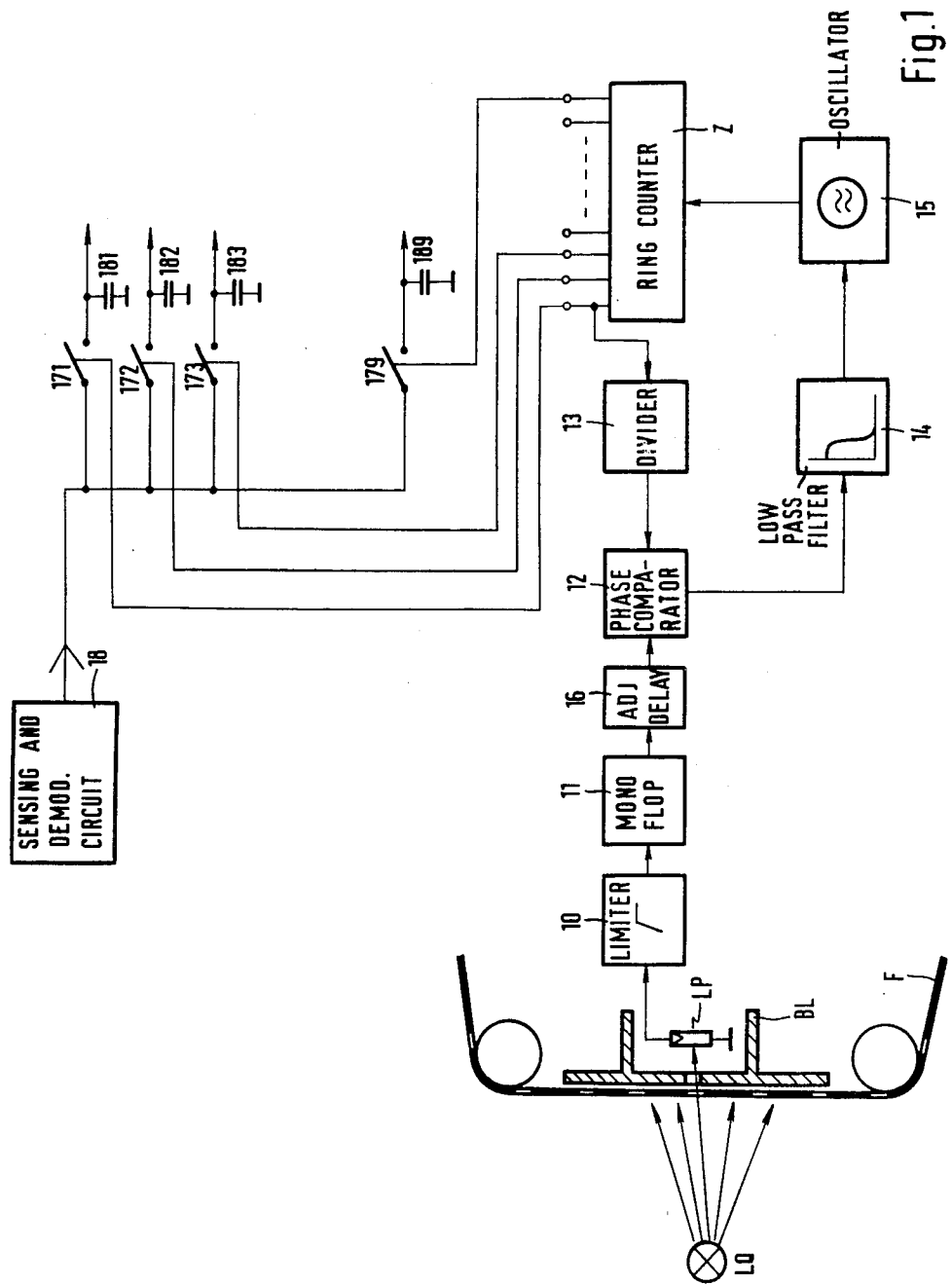
FIG. 1 is a schematic representation of a control loop for synchronizing a rotating switch and an arrangement for scanning information on the feed track using an interposed hole diaphragm.

Referring to FIG. 1, the film F passes through a light barrier consisting of the light source LQ and the photocell LP. Of the light emitted from the light source LQ, only the portion falling through the aperture of the diaphragm BL reaches the photocell LP, and this only if a sprocket hole P shown in FIG. 2a of the feed track TS is in front of the aperture. The output signal of the photocell LP is fed to a limiter 10. The signal generated in the limiter serves to control a monoflop 11 which forms a square-wave pulse of constant duration whose repetition frequency is determined by the speed of the film F moving in front of the diaphragm BL and by the spacing of the holes P. Since the speed of the film F and the spacing of the holes P are standardized values, the above repetition frequency of the pulses at the output of the monoflop 11 is a fixed value also.

The output of the monoflop 11 is connected to one input of a phase comparison circuit 12.

The function of the monoflop is to utilize only that limit of the hole P for the phase comparison which lies at the rear in relation to the film's direction of movement because the front limit may easily be damaged by the transport members in the projector if the film is used very often. The monoflop thus delivers to the phase comparison circuit a square-wave voltage of constant pulse length whose front edge is triggered only by the light-dark variation at the photocell.

As also shown in FIG. 1, an oscillator 15 controls a ring counter Z which, together with the switches 171 – 179, represents the rotating switch.

The sequence of amplitude information of the partial frequency ranges, is restored in a manner as described in the commonly assigned copending U.S. applications Ser. No. 485,865 and 334,525, is fed to the inputs of the switches 171 – 179 from a readout and demodulating circuit 18 substantially as shown in the commonly assigned applications. The switches 171 – 179 are closed cyclically and successively at the rate of the oscillator 15 via the ring counter Z; thus, the time sequence of the amplitude information is resolved. The individual bits of amplitude information are retained in one of the storages 181 – 189 for one cycle each and serve to control modulators as described in the copending applications.

These operations need not be explained in detail within the scope of the present invention.

In order that the time selection of the amplitude information by means of the switches 171 – 179 agrees in frequency and phase with the sequencing carried out at the pick-up end, i.e., in order that the respective first amplitude information of a cycle may be fed to the storage 181, for example, the frequency of the oscillator or a subharmonic obtained by, e.g., division is compared with the sync signal stored on, and scanned from, the feed track TS.

To this end, as shown in FIG. 1, it is necessary to divide the cycle frequency, which is equal to the frequency of the oscillator 15 divided by the number of ring-counter position (number of the switches 171 –

179), down to the value of the passage rate of the holes P by means of a frequency divider 13.

As indicated above, the two signal voltages to be compared, i.e., the output voltage of the oscillator 15, which has been frequency-divided as described, and the sync signal serving as the reference signal and derived from the moving film, are fed to a phase comparitor circuit 12.

At its output the phase comparitor circuit 12 provides a voltage whose magnitude and polarity depend on the phase difference between the signals to be compared. This voltage is passed through a low-pass filter 14 and serves as readjustment voltage for the frequency and thus phase controllable oscillator 15, which is readjusted until the signals to be compared are in phase.

As also shown in FIG. 1, an adjustable delay circuit 16 is inserted between the monoflop 11 and the phase comparison circuit 12. It serves to displace the sync signal in time if the sound signal and the sync signal are not picked off the optical sound track LT and the feed track TS of the film F in parallel manner, i.e. with a spatial displacement, which may be due to the design of the film projector, for example.

Figure 2A:
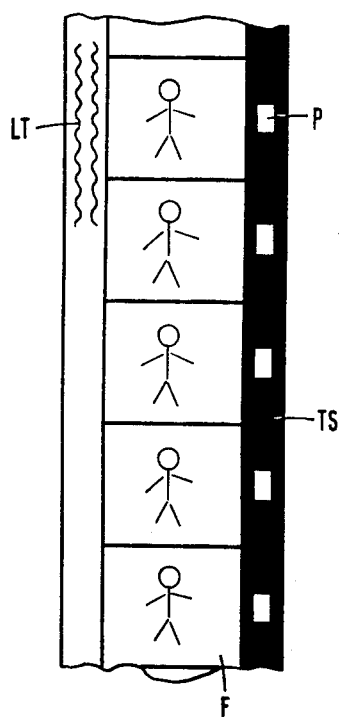
FIGS. 2a and 2b show different kinds of information on the feed track.
Figure 2B:
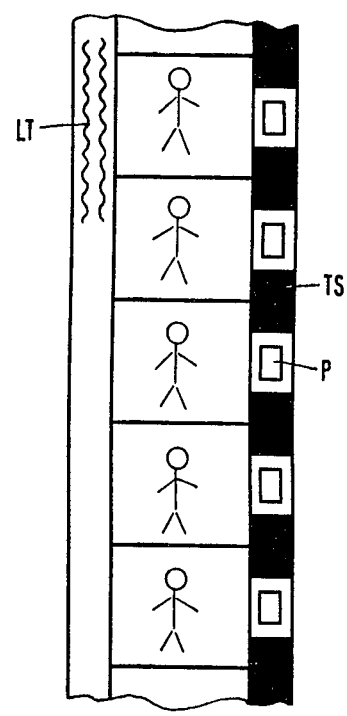

FIGS. 2a and 2b show two variants of the representation of information on the feed track.

The feed track TS of FIG. 2a is dark, i.e. opaque, over its entire length, and only the holes P allow light to pass through, so that the repetition rate of the holes can be evaluated as the reference signal.

In FIG. 2b the feed track TS is divided into light transparent or translucent zones and dark opaque zones equal in area so that the sprocket holes are always within the light zones. In this embodiment, the zonal limits between light and dark can be utilized for the reference signal; this means that, compared with FIG. 2a, the frequency of the reference signal is doubled.

Figure 3:
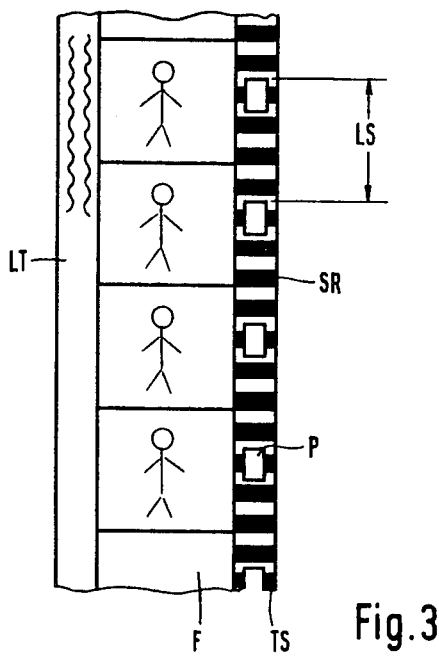
FIG. 3 shows the information in the form of a line pattern on the feed track.

FIG. 3 shows a section of sound film whose feed track TS has a line pattern SR. The line sequence is spaced so that during playback a frequency is obtained which corresponds to the cycle rate or to a subharmonic of the rotating switch (Z, 171 – 179).

This line pattern could be scanned, like the information of FIGS. 2a and 2b, by means of a hole diaphragm as shown in FIG. 1, but instead use is made of a diaghragm with a reference line pattern which has the same line spacing as the film.

In this manner, a variation in brightness is obtained over a longer distance such that, if the two line patterns coincide, light transmission will be at a maximum, while in case of the reference pattern coinciding with the slits of the line pattern to be scanned, illumination will be at a minimum.

The perforation P causes an undesired brightness variation only if the length of the reference pattern is not adjusted to the spacing of the perforation P. If, however, the length of the reference pattern is equal to the spacing of the holes, the same hole section will always be in the portion to be evaluated as the film is passing through. As a result, the brightness variation is largely independent of the perforation.

Figure 4:
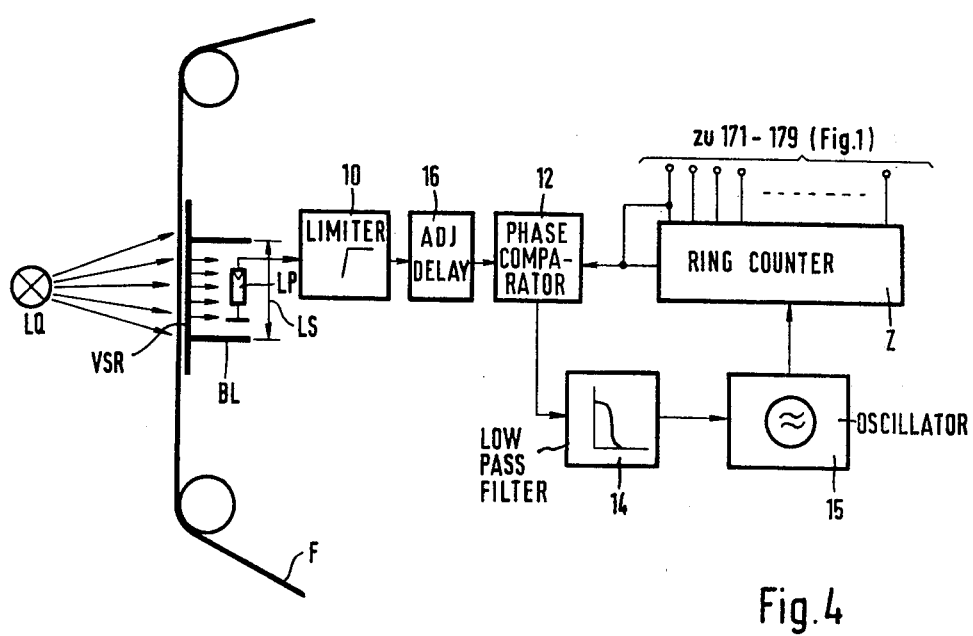
FIG. 4 is a schematic representation of the control loop for synchronizing the rotating switch and an arrangement for scanning the information on the feed track using an interposed scanning diaphragm.

FIG. 4 shows schematically how the line pattern is evaluated. The film F passes with its feed track TS through a light barrier formed by the light source LQ and a photocell LP. Inserted in this light barrier is a diaphragm BL whose aperture has the length Ls and within which the reference pattern VSR is disposed. The length LS, as mentioned above, corresponds to the distance between two sprocket holes P on the feed track of the film. As the film is passing through, the photocell LP provides an output signal whose frequency corresponds to that at which the light source was controlled at the pick-up end.

The circuit arrangement of FIG. 4 differs from that of FIG. 1 in that the frequency divider 13 may be omitted if the spacing of the line pattern SR (and the feed rate) corresponds to a frequency which is equal to the cycle rate of the rotating switch Z, 171 – 179, and that the monoflop 11 is no longer necessary.

Otherwise, the circuit of FIG. 4 works in the same manner as that of FIG. 1.

It is to be understood that the foregoing description of specific examples of this invention is made by way of example only and is not to be considered as a limitation on its scope.

What is claimed is:

1. A method for providing synchronization, in a system for transferring wide-band sound signals of the type wherein at the input end of the system the sound signal is divided into a lower and a higher frequency range, the signal of the lower frequency range is transferred directly while the signal of the higher frequency range is divided into partial higher frequency ranges, the amplitude of each of said partial higher frequency ranges being detected and used to sequentially modulate a single subcarrier frequency which is thereafter transferred to a reproducing end where the subcarrier frequency is demodulated to obtain the amplitude information of each partial high frequency range said sequential amplitude information being separated by a time selection operating electronic switch said amplitude information being used to modulate an equivalent signal lying approximately in the center of the individual partial high frequency ranges, said modulated equivalent sound signal being added to the directly transferred lower frequency range signal for reproduction of the wide-band sound signal, comprising the steps of:

recording the lower frequency range signal and the sequentially modulated subcarrier signal on the sound track of a sound film;

providing periodic information on another track of the sound film;

detecting the periodic information at the reproducing end; and synchronizing said electronic time selection switch with said periodic information at the reproducing end, so that the amplitude information of each partial high frequency range is provided to the proper equivalent sound signal.

2. A method as described in claim 1, wherein the periodic information is provided on the feed track of the sound film in the form of perforations which serve as sprocket holes in the feed track, said perforations being detected by scanning said feed track with a line source and detector.

3. A method as described in claim 1, wherein the periodic information is provided in the form of a pattern consisting of alternate light transmitting and opaque zones.

4. A method as described in claim 1, wherein the periodic information is provided on the track in the form of a line pattern.

5. A method as described in claim 4, in which the line pattern is formed on the feed track and is detected by a diaphragm containing a reference line pattern having a length equal to the distance between two successive sprocket holes of the feed track.

6. A method as described in claim 2, additionally comprising the step of detecting the rear edge of the sprocket hole as determined in relation to the films direction of movement.

7. A method as described in claim 1, wherein the step of synchronizing the electronic time selection switch comprises the steps of:
controlling the electronic time selection switch with an oscillator frequency;
comparing the oscillator frequency with the detected periodic information; and
controlling the frequency of said oscillator with a signal derived from the comparison between the oscillator frequency and the periodic information.

8. A method as described in claim 7, additionally comprising the step of dividing the oscillator frequency by the number of partial higher frequency ranges.

9. A method as described in claim 1, additionally comprising the steps of:
providing a signal corresponding to the detected periodic information;
adjustably delaying said signal to compensate for any spatial displacement between the recording on the sound track and the periodic information.

10. A receiver for use in an information transfer system of the type wherein a number of information signals are sampled and thereafter sequentially and cyclically recorded on a first track of an elongated storage means and a periodic sync signal corresponding to the cyclic repetition is recorded on a separate track of said elongated storage means, comprising:
means for sensing and reproducing the periodic sync signal;
means for sensing and reproducing the recorded sequential information signals;
means for storing a like number of information signals;
electronic rotary switch means for receiving the sequential information signals from said sensing and reproducing means and for distributing said signals to the information storing means;
synchronizing means responsive to the periodic sync signal for synchronizing the electronic rotary switch means so that the proper information signal is stored in the proper information storage means.

11. A receiver as described in claim 10, wherein the elongated storage means is a film and the periodic sync signal is recorded in the form of alternate light transmitting zones and opaque zones on the separate track and the sensing and reproducing means comprises:
a light source;
photo-electric means for providing an electric signal corresponding to the received light, said means being disposed on an opposite side of said film from said light source so that the received light corresponds to the zones on said film.

12. A receiver as described in claim 10, wherein the synchronizing means comprises:
oscillator means for providing a control signal to said electronic rotary switch for controlling the same;
comparator means for comparing the oscillator signal with the periodic sync signal and providing an output signal corresponding to a phase difference between said signals, said oscillator being responsive to the output signal of the comparator for adjusting the frequency of the control signal.

13. A receiver as described in claim 12, additionally comprising:
a frequency divider for dividing the oscillator control signal frequency by the number of information signals transferred so that an output is provided for each repetition of the cyclic recording, said comparator means comparing the divided signal with the periodic sync signal so that the frequency of the oscillator is adjusted until the electronic rotary switch is properly synchronized.

14. A receiver as described in claim 12, wherein the electronic rotary switch comprises a number of electronic switches each having a separate control input and a ring counter receives the oscillator control signal and has a number of outputs for sequentially providing output signals to the control inputs of the electronic switches so that the switches sequentially and cyclically close.

15. A receiver as described in claim 10, additionally comprising an adjustable delay means for delaying the reproduced periodic sync signal to compensate for any misalignment of the sensing means.

* * * * *